C. B. EATON.
NUT CRACKING MACHINE.
APPLICATION FILED MAY 11, 1921.
1,408,697.
Patented Mar. 7, 1922.
3 SHEETS—SHEET 2.
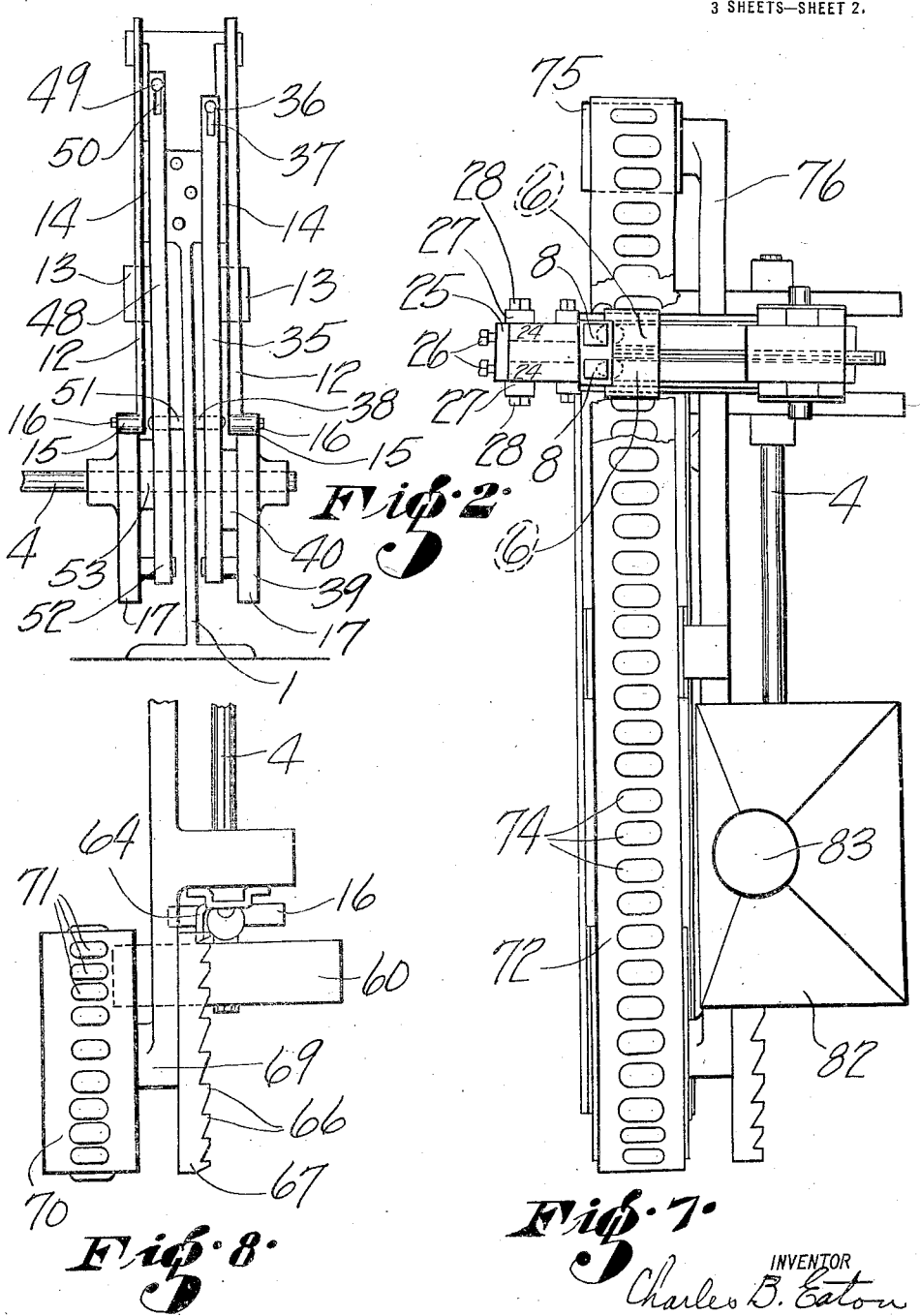
INVENTOR
Charles B. Eaton
BY
Adam E Fisher
ATTORNEY C. B. EATON.
NUT CRACKING MACHINE.
APPLICATION FILED MAY 11, 1921.
1,408,697.
Patented Mar. 7, 1922.
3 SHEETS—SHEET 3.
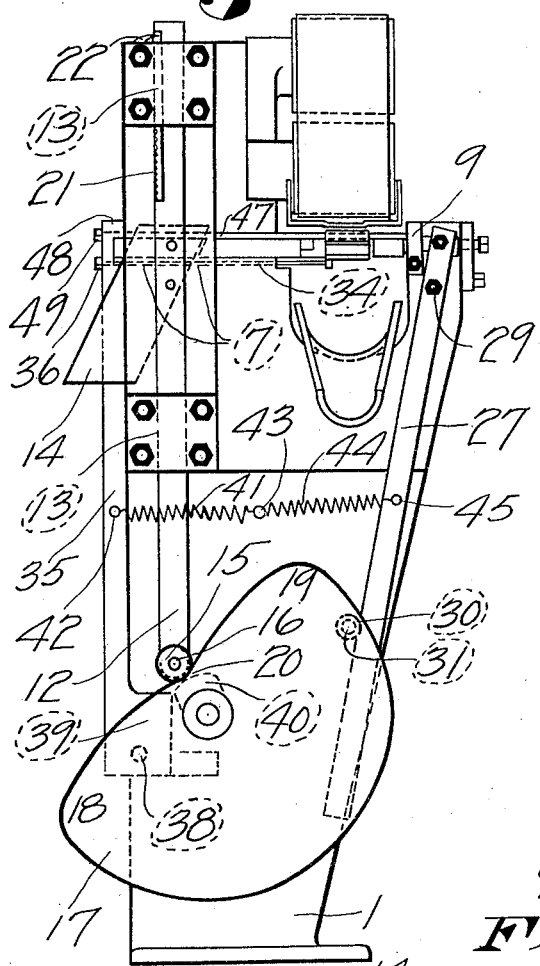
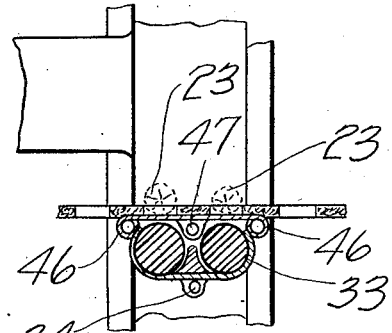
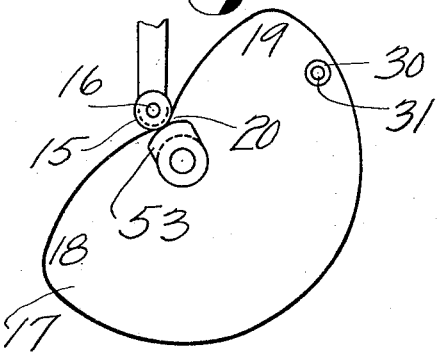
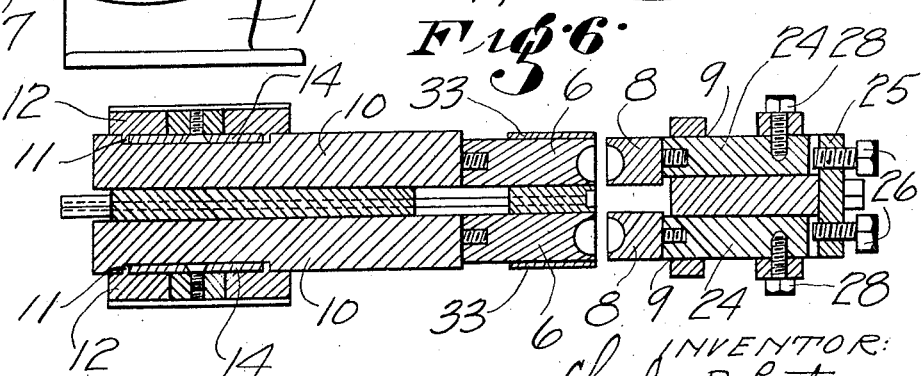
INVENTOR:
Charles B. Eaton
BY: Adam E. Fisher
ATTORNEY.

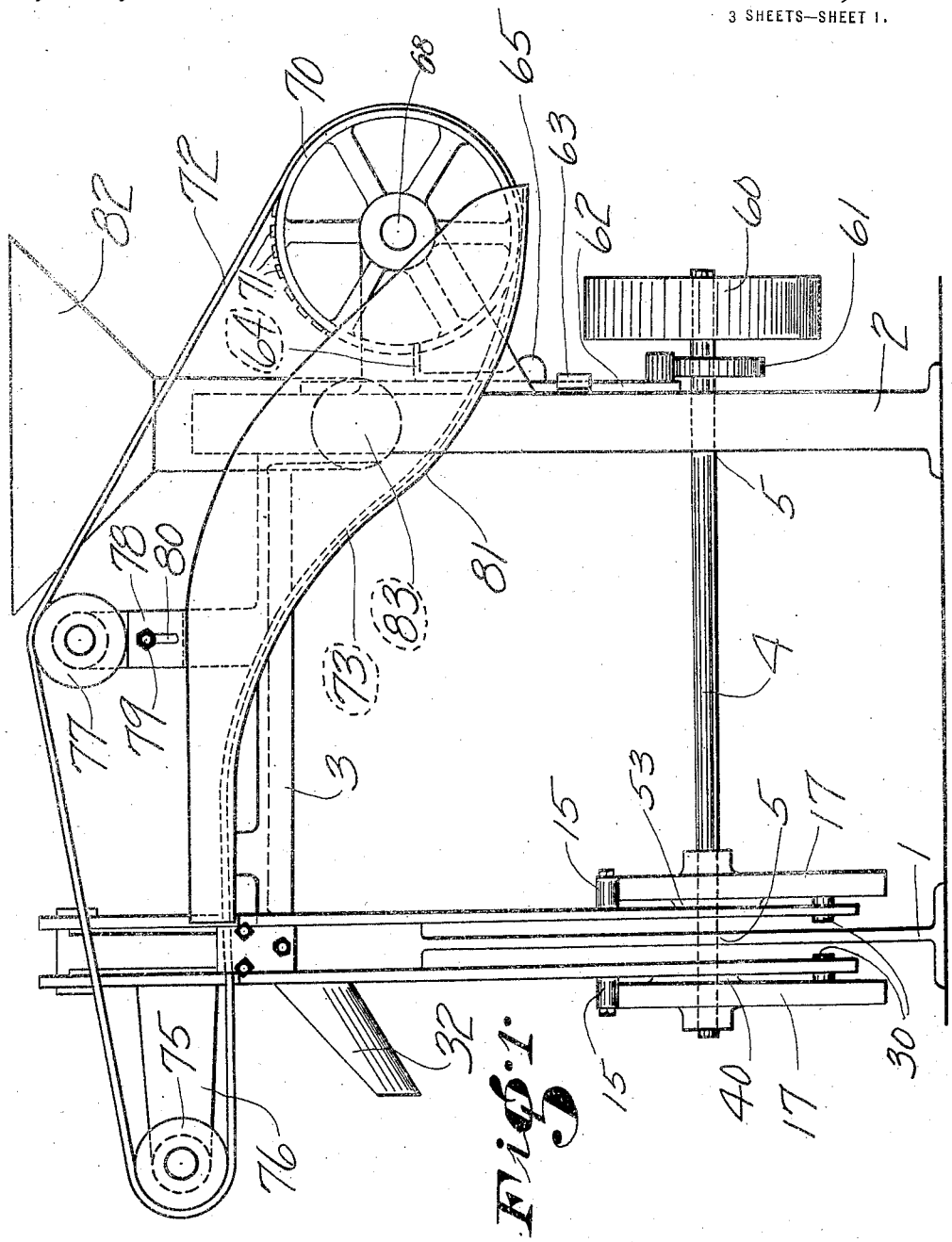

UNITED STATES PATENT OFFICE.

CHARLES B. EATON, OF ST. LOUIS, MISSOURI.

NUT-CRACKING MACHINE.

1,408,697. Specification of Letters Patent. Patented Mar. 7, 1922.

Application filed May 11, 1921. Serial No. 468,581.

*To all whom it may concern:*

Be it known that I, CHARLES B. EATON, a citizen of the United States, residing in the city of St. Louis and State of Missouri, have invented new and useful Improvements in Nut-Cracking Machines, of which the following is a specification, reference being had to the accompanying drawings.

This invention relates to improvements in nut cracking mechanisms, and the main object is to provide an automatic mechanism of this character, having self adjusting cracking jaws and other automatic features, and to which the nuts are fed by any suitable feeding mechanism, such as a feed belt moving over pulleys and running through a hopper containing the nuts to be cracked.

In the drawings:

Figure 1 is a right side elevation of a machine embodying this cracking mechanism in combination with a suitable feeding mechanism.

Figure 2 is a left side elevation of the nut cracking elements only.

Figure 3 is a front elevation.

Figure 4 is a vertical sectional detail of the nut cracking mechanism.

Figure 5 is a detail of the rear cam located immediately back of the front cam shown in Figure 2.

Figure 6 is a horizontal sectional view of the nut cracking mechanism.

Figure 7 is a top plan view of the entire machine.

Figure 8 is a detail of a belt sprocket and operating mechanism which may be employed to intermittently move the belt and nuts forwardly to the cracking mechanism.

It is understood that the invention herein embodied is based primarily upon the nut cracking mechanism, the feeding mechanism being included only in broad combination; and the right is reserved to file a separate application based upon the feeding mechanism.

The working parts of the machine as a whole are supported by a frame including the main uprights 1 and 2, the cross bar 3, and extensions and braces. Upon the lower portion of the uprights 1 and 2 is mounted the horizontal drive shaft 4, same being journaled in suitable bearings at 5, and this shaft supplies the power for operating the machine.

The nut cracking mechanism constituting this invention consists, in combination with a cooperating nut delivering shuttle and a nut holder to be later described, of a pair of reciprocating, self adjusting pick-up jaws 6, horizontally and slidingly mounted in guide ways 7 located in the upper portion of the frame, and working in conjunction with a complementary pair of reciprocating cracking jaws 8, oppositely mounted in the guide ways 9 and in alignment with the pick-up jaws 6. The function of the pick-up jaws is to adjust nuts of varying sizes or lengths against the ends of the cracking jaws, before the latter are operated to crack the nuts; and the mechanism controlling these two sets of jaws will be now explained. The shanks 10 of the pick-up jaws 6 are extended out, and cam mortises 11 are cut in the outer side faces of each shank, said mortises being inclined outwardly from the top sides to the bottom sides of the shanks. Adjacent these mortises vertical drop bars 12 are slidingly mounted through guide-ways 13, and these drop bars have cam-plates 14 bolted thereon, said plates being cut obliquely and complementary to the cam mortises 11 and so as to slide freely therein. The action of the plates 14 in the mortises 11 is to move the pick-up jaws 6 inwardly and outwardly, alternately, as the drop bars 12 move up and down. At the lower ends of the drop bars 12 rollers 15 are journaled on stub shafts 16 mounted on the outer lateral faces of said drop bars; and these rollers are adapted to travel the peripheries of the two identical master cams 17, which are spaced apart and mounted at the forward end of the drive shaft 4, one at each side of the bearing 5. The cams 17 are in form somewhat greater than half circles, the truncated sides being rounded off at the corners 18—19 and curved inwardly at the centers 20, to facilitate the travel of the rollers 15. The cams 17 are to rotate clockwise, regarding the machine from the front, and their action then is to first raise the drop bars 12 over the shoulders 18, and then to drop them with relative suddenness from the shoulders 19 to the centers 20; and the resultant action of the cam plates 14 playing in the cam mortises 11 is to first draw the pick-up jaws 6 outwardly as the drop bars 12 rise, and then drive them suddenly inwardly as the bars fall; and as the pick-up jaws 6 move inwardly they press the nuts 23 snugly up against the opposed ends of the cracking jaws 8, as before stated. A degree of lateral play is allowed the upper ends of the drop bars 12 in passing through their guide-ways 13, and racks of teeth 21 are formed on the outer edges of the upper ends of these bars 12, and stop-bits 22 are mounted at the tops of the guide-ways 13 and adapted to lockingly engage said racks 21 when said bars 12 are pressed outwardly, as occurs when the cracking jaws are forced inwardly against the nuts; and thus the pick-up jaws are held locked until the cracking process is completed.

The function of the cracking jaws 8, reciprocatingly mounted in their guide-ways 9 as stated, is to cooperate with the aligned pick-up jaws and exert a cracking pressure upon the nuts positioned between the pick-up jaws and the cracking jaws, after the pick-up jaws have first pressed the nuts up against the cracking jaws in manner described. The shanks 24 of the cracking jaws 8 extend out adjacent a stop-plate 25 mounted on the frame, and adjustment screws 26 are passed through this plate and their inner ends adapted to approach the extremities of the shanks 24, and thus the degree of travel of said shanks and attached cracking jaws may be readily regulated. The shanks 24 of the cracking jaws 8 are pivotally connected to the upper ends of the cracking levers 27 by means of set screws 28 passed loosely through the lever ends and into the outer side faces of said shanks 24. The cracking levers 27 are pivoted to the frame by means of bolts 29 passed loosely through the levers at points spaced slightly below the upper ends of said levers. The lower ends of said cracking levers 27 extend downwardly and are inclined inwardly, across the adjacent inner faces of the master cams 17. Rollers 30 journaled on stub shafts 31 mounted on the inner faces of the cams 17, at points spaced from the shoulders 19 and near the peripheries of said cams, are so located and adjusted as to impinge the lower ends of the cracking levers 27, as the cams 17 rotate clockwise, and to press said lever ends outwardly just enough to move the cracking jaws 8 inwardly sufficient to crack the nuts 23 braced against the opposed ends of the pick-up jaws 6. Owing to the peculiar form of the cams 17, while the cracking levers 27 and jaws 8 are being operated by the rollers 30, the rollers 15 of the drop bars 12 rest quietly at the centers 20 of the cams 17. When the nuts are cracked they fall into a chute 32, whereupon the lateral pressure upon the drop bars 12 being released, the racks 21 fall away from the stop-bits 22, and simultaneously rotating cams 17 raise the rollers 15 over their shoulders 18, thus again elevating the drop bars 12 for a repetition of the cracking process, and the retractile springs 44 distended between the pins 43 and 45 on the frame and levers respectively, act to return said levers to their original position.

The mechanism for delivering the nuts two at a time, and for holding them while being cracked, will now be described. Immediately under the adjacent ends of the pick-up jaws and the cracking jaws as described, is mounted a reciprocating nut holder 33 at the end of the control rod 34, and adapted to hold two nuts 23 side by side and in aligned position for cracking between the said pick-up jaws 6 and the cracking jaws 8. The opposite end of this control rod 34 extends outwardly to the left side of the machine and is loosely connected to the upper end of the nut holder lever 35 by means of a set screw 36 passed freely through a slot 37 formed through the end of the lever. The lower end of this lever is pivoted by the pin 38 to the base of the frame of the machine, over the inner face of the frontal master cam 17, and is thus adapted to oscillate laterally in a plane parallel to the plane of said cam. The lower end of the lever 35 is formed with a cam or heel 39, extended inwardly and adapted to be impinged by the holder cam 40 so located on the inner or rear face of the frontal master cam 17, that as the cam 17 rotates clockwise the cam 40 will strike the heel 39, and so press the lever 35 outwardly and withdraw the nut holder 33 from its supporting position below the nuts 23, immediately after the rollers 30, acting against the levers 27, have operated the cracking jaws 8 and cracked the nuts 23. The cracked nuts fall into the chute 32, and the revolving cam 40 simultaneously passes up over the heel 39 and so releases the lever 35, which lever then returns to its original or inmost position through the action of the retractile spring 41 distended between the pins 42 and 43 on the said lever and frame respectively, and the nut holder 33 is also of course thereby returned to position below the jaws 6 and 8. Immediately above the nut holder 33 and the contiguous ends of the jaws 6 and 8, is mounted the reciprocating nut delivering shuttle 46 at the end of its control rod 47, and adapted to receive two nuts at a time from the nut feeding mechanism employed and hold them in readiness for delivery into the nut holder 33 immediately as the said nut holder discharges the cracked nuts already therein, in manner described. The opposite end of this control rod 47 extends out to the left side of the machine, and is loosely connected to the upper end of the shuttle lever 48, by means of a set screw 49 passed freely through a slot 50 through the end of the lever. The lower end of this lever is pivoted by the pin 51 to the base of the frame, over the inner or frontal face of the rear master cam 17, and is thus adapted to oscillate laterally in a plane parallel to the plane of said cam. The lower end of the lever 48 is formed with a cam or heel 52 extended inwardly and adapted to be impinged by the shuttle cam 53 so located on the inner or forward face of the rear master cam 17, that as the cam 17 rotates clockwise the cam 53 will strike the heel 52, and so press the lever 48 outwardly and withdraw the shuttle 46 from beneath the nuts 23 immediately after the nut holder 33 has been returned to its position beneath said jaws 6 and 8 after discharging its burden of cracked nuts in manner described, and so cause the nuts resting on the delivery shuttle 46 to fall into the nut holder 33 and reload same. The shuttle 46 is then returned to its inmost position, ready to receive two more nuts from the feeding mechanism, through the action of a retractile spring similar to the spring 41 and similarly mounted between the frame and lever. Thus the operation of the cracking mechanism is continuous. The shaft 4 is rotated by any suitable means.

A suitable feeding mechanism will now be described in combination with the cracking mechanism. The right is reserved to file a separate application for patent thereon at a later date. At the rear end of the shaft 4 is rigidly mounted a drive wheel 60 and the eccentric cam 61. Immediately above the said eccentric cam 61, supported upon the upright 2 is the guide 62 sliding through the sleeve 63. At the upper end of said guide 62 is pivotally mounted the gravity pawl 64 controlled by means of the weight 65 at its lower end. The pawl 64 engages a series of saw teeth 66 around the lateral periphery of the ratchet wheel 67. The ratchet wheel 67 is rigidly mounted upon the shaft 68 supported by the bearing 69, the other end of said shaft carrying the rigidly mounted sprocket wheel 70, which is provided upon its periphery with the transversely disposed sprockets 71. Over the said sprocket wheel 70 revolves the feed belt 72—73, having the transversely cut apertures 74 ranged at suitable distances apart along said feed belt to exactly engage and cooperate with the sprockets 71 aforesaid. Said feed belt 72—73 is supported at its forward end by the auxiliary pulley 75 mounted at the end of the support 76, and medially by the auxiliary pulley 77 movably mounted at the upper end of the support 78 by means of the bolt 79 working through the slot 80, by which arrangement said belt may be tightened or loosened at will. The lower portion 73 of said feed belt 72—73 moves forwardly along the bottom of the funnel 81. The chute 32 is mounted immediately under the forward portion of the feed belt 72—73, and the nut cracking mechanism already described, for the purpose of catching and conveying to any suitable receptacle the nuts as they are cracked and fall from the machine. The nut holding hopper 82 is supported at the upper end of the upright 2, whence the nuts are conveyed by gravity down through the chute 83 out onto the feed belt 72—73. The nuts to be cracked are placed in the hopper 82, whence they move by gravity down into the chute 83 and out onto the lower side 73 of the feed belt 72—73, the lower side 73 of said feed belt being propelled forward by the sprockets 71, which play into the apertures 74 of said feed belt. As the nuts roll out onto the lower side 73 of the feed belt 72—73, they adapt themselves to the apertures 74 and are thereby carried forward to the nut cracking mechanism. Any surplusage of nuts fall back against the sprocket wheel 70 and remain there until they in turn are carried forward by the belt. The resultant of the vertical, reciprocating action of the pawl 64 upon the ratchets 66 of the ratchet wheel 67 is such as to impart an intermittent, rotary motion to said sprocket wheel 70, and a like intermittent forward movement in the lower portion 73 of the belt 72—73, as said belt carries the nuts forward to the cracking mechanism. The purpose of this intermittent motion is that as the nuts, as 23, reach a point immediately above the nut delivering shuttle 46, the belt 72—73 is caused to pause just long enough to allow this shuttle, which at this point sustains the nuts, to be automatically withdrawn from below the nuts, through the operation of the nut cracking mechanism as described, and so as to permit the nuts to fall into the nut holder 33, wherein owing to the shape of said holder, the said nuts dispose themselves with their opposite ends in alignment with the pick-up jaws 6 and the nut cracking jaws 8. The nuts being so disposed in the holder 33, the shuttle 38 is automatically returned to its first position, while the nuts are thus held in place by the holder 33 for the purpose of being cracked. At the same time the belt 73 is moving forward and bringing two additional nuts to rest upon the upper side of the shuttle 38 and ready to follow into the holder 33 upon the nuts in the holder being cracked and discharged into the chute 32, as described.

It will be noted that while I have here described a machine for cracking two nuts at a time, other and additional cracking units may be harnessed to the same mechanism so that four or six or more nuts may be cracked simultaneously. It will be noted that the automatic action of the pick-up jaws and mechanism against the cracking jaws is such as to automatically adjust said mechanism to nuts of varying sizes. It will be noted that by turning the set screws 26 the stroke of the cracking jaws 8 may be readily regulated.

While I have herein described certain specific elements and manner of constructing and assembling the same for accomplishing the purpose of my invention, it will be understood that I am not bound to strickly observe this specific construction, but may vary from the same in minor details, not departing from the spirit of my invention so as best to construct my machine to meet all practical requirements.

I claim:

1. In combination with feeding means, a nut cracking machine, comprising oppositely disposed and horizontally aligned and reciprocating pick-up jaws and nut cracking jaws; a reciprocating nut receiving and delivering shuttle above the adjacent ends of the jaws; a reciprocating nut holder beneath the ends of the jaws; means for adjusting the pick-up jaws relative to the cracking jaws; means for moving the cracking jaws relative to the pick-up jaws; means for moving the nut receiving and delivering shuttle to drop the nuts into the nut holder; and means for moving the nut holder to discharge the cracked nuts therefrom.

2. In combination with suitable feeding mechanism, a nut cracking machine, comprising oppositely disposed and horizontally aligned reciprocating pick-up jaws and nut cracking jaws; a reciprocating nut receiving and delivering shuttle immediately over the adjacent ends of the jaws; a reciprocating nut holder immediately beneath the ends of the jaws; means for automatically adjusting the pick-up jaws relative to the cracking jaws, said means consisting of drop bars vertically and slidingly mounted at the outer ends of the pick-up jaws and so connected therewith as to convert the vertical reciprocating motion of the bars into horizontal reciprocating motion of said jaws, and rotating cams controlling the lower ends of the drop bars to impart suitable vertical reciprocating motion to the bars; means for moving the cracking jaws relative to the pick-up jaws, said means consisting of cracking levers pivoted immediately below the cracking jaws and pivotally connected at their upper ends to said jaws, and rotating cams controlling the lower ends of the cracking levers to move the cracking jaws; means for moving the nut receiving and delivering shuttle and the nut holder, said means consisting of control rods extended laterally one from the shuttle and one from the holder, vertical levers pivoted below the outer ends of the rods and pivotally connected therewith at their upper ends, and rotating cams controlling the lower ends of said levers to produce the movements required in said shuttle and holder.

3. In a nut cracking machine, a frame, a shaft journaled in said frame, cams on said shaft, levers pivotally mounted in the frame and each adapted to have one end operatively engage one of the cams, a nut holder, a rod operatively connecting said nut holder and adapted to impart an oscillatory movement thereto, pick-up jaws movably mounted in the frame, oblique plates controlling the movement of the pick-up jaws, pick-up levers movably mounted in the frame and operatively connected to the oblique plates, said levers being operatively engaged by the cams, nut cracking jaws, levers operatively connected at their upper extremities to the nut cracking jaws and controlled at their lower ends from the cams, and means for feeding nuts to the nut holder.

CHARLES B. EATON.

Witnesses:
 FRED SCHLEYER,
 WILLIAM J. DONAHOE.